United States Patent
Kai et al.

(10) Patent No.: US 11,342,841 B2
(45) Date of Patent: May 24, 2022

(54) METHOD FOR CONTROLLING RESONANCE-TYPE POWER CONVERTER, RESONANCE-TYPE POWER CONVERTER, AND DC-DC CONVERTER

(71) Applicant: NISSAN MOTOR CO., LTD., Yokohama (JP)

(72) Inventors: Toshihiro Kai, Kanagawa (JP); Shigeharu Yamagami, Kanagawa (JP); Tetsuya Hayashi, Kanagawa (JP); Yusuke Zushi, Kanagawa (JP); Taku Shimomura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/977,876

(22) PCT Filed: Mar. 7, 2018

(86) PCT No.: PCT/JP2018/008821
§ 371 (c)(1),
(2) Date: Sep. 3, 2020

(87) PCT Pub. No.: WO2019/171510
PCT Pub. Date: Sep. 12, 2019

(65) Prior Publication Data
US 2021/0057995 A1    Feb. 25, 2021

(51) Int. Cl.
*H02M 3/156* (2006.01)
*H02M 3/00* (2006.01)
(Continued)

(52) U.S. Cl.
CPC ............. *H02M 3/156* (2013.01); *H02M 3/01* (2021.05); *H02M 1/0058* (2021.05); *H02M 7/4815* (2021.05)

(58) Field of Classification Search
CPC ...... H02M 1/0058; H02M 1/083; H02M 3/01; H02M 3/015; H02M 3/145;
(Continued)

(56) References Cited

U.S. PATENT DOCUMENTS 6,912,137 B2 *  6/2005  Berghegger ............ H02J 50/12
                                              363/21.03
8,406,014 B2 *  3/2013  Liu ....................... H02M 3/337
                                              363/21.02
(Continued)

FOREIGN PATENT DOCUMENTS

JP           9-9615 A       1/1997
JP       2016-152639 A      8/2016
WO    WO 2013/114758 A1     8/2013

OTHER PUBLICATIONS

Jurkov et al., "Tunable Impedance Matching Networks Based on Phase-Switched Impedance Modulation", 2017 IEEE Energy Conversion Congress and Exposition, Oct. 1, 2017, pp. 947-954.

*Primary Examiner* — Fred E Finch, III
(74) *Attorney, Agent, or Firm* — Foley & Lardner LLP

(57) ABSTRACT

The present disclosure includes by controlling at least either one of a switching frequency of a switching element (S) or a duty ratio indicating an ON period of the switching element, securing delay time from voltage at both ends of the switching element reaches zero voltage by resonance of the resonant circuit ($L_o$, $C_o$) in an OFF state of the switching element until the switching element is turned on, and turning on the switching element within the delay time.

8 Claims, 9 Drawing Sheets

(51) Int. Cl.
*H02M 1/00* (2006.01)
*H02M 7/48* (2007.01)

(58) Field of Classification Search
CPC ..... H02M 3/155–1588; H02M 7/4815; H02M 7/4818
See application file for complete search history.

(56) References Cited

U.S. PATENT DOCUMENTS

| | | | |
|---|---|---|---|
| 9,425,676 B2* | 8/2016 | Liu | H02M 3/33576 |
| 9,960,689 B1* | 5/2018 | Lu | H02M 3/3376 |
| 2005/0152159 A1* | 7/2005 | Isurin | H02M 3/33576 363/17 |
| 2007/0297199 A1* | 12/2007 | Sauerlander | H02M 3/3382 363/21.02 |
| 2008/0219033 A1 | 9/2008 | Nishikawa | |
| 2012/0044722 A1 | 2/2012 | Cuk | |
| 2013/0314958 A1 | 11/2013 | Kern | |
| 2014/0355313 A1 | 12/2014 | Nishikawa | |
| 2016/0241128 A1 | 8/2016 | Imai et al. | |
| 2017/0214278 A1 | 7/2017 | Hosotani | |
| 2017/0264206 A1 | 9/2017 | Rana et al. | |

\* cited by examiner

METHOD FOR CONTROLLING RESONANCE-TYPE POWER CONVERTER, RESONANCE-TYPE POWER CONVERTER, AND DC-DC CONVERTER

TECHNICAL FIELD

The present invention relates to a method for controlling a resonance-type power converter, a resonance-type power converter, and a DC-DC converter.

BACKGROUND ART

A control device of a resonance DC-DC converter including, based on a determined control amount, a frequency modulation control means for performing frequency modulation control a semiconductor switching element at a frequency lower than a resonance frequency of a series resonant circuit, a fixed-frequency control means for performing fixed-frequency control by pulse-width modulation control or phase modulation control of a semiconductor switching element at the resonance frequency, and a pulse distribution means for generating driving pulse of the semiconductor switching element based on an output of the frequency modulation control means and fixed-frequency control means is known (Patent Document 1).

PRIOR ART DOCUMENT

Patent Document

[Patent Document 1] WO 2013/114758 A

SUMMARY OF INVENTION

Problems to be Solved by Invention

In a prior art, there is a problem that a switching loss increases since soft switching cannot be performed when output power is reduced by increasing switching frequency of the switching element.

A problem to be solved by the present invention is to provide a method for controlling a resonance-type power converter capable of enhancing efficiency of the resonance-type power converter by expanding a range of switching frequency capable of soft switching, a resonance-type power converter, and a DC-DC converter.

Means for Solving Problems

According to the present invention, the above problem is solved by controlling at least either one of a switching frequency of the switching element and a duty ratio indicating an ON period of the switching element, securing a delay time from voltage at both ends of the switching element reaches zero voltage by resonance of a resonant circuit in an OFF state of the switching element until the switching element is turned on, and turning on the switching element within the delay time.

Effect of Invention

According to the present invention, efficiency of a resonance-type power converter can be enhanced.

MODES FOR CARRYING OUT THE INVENTION

In the following, embodiments of the present invention will be explained with reference to the drawings.

First Embodiment

Figure 1:
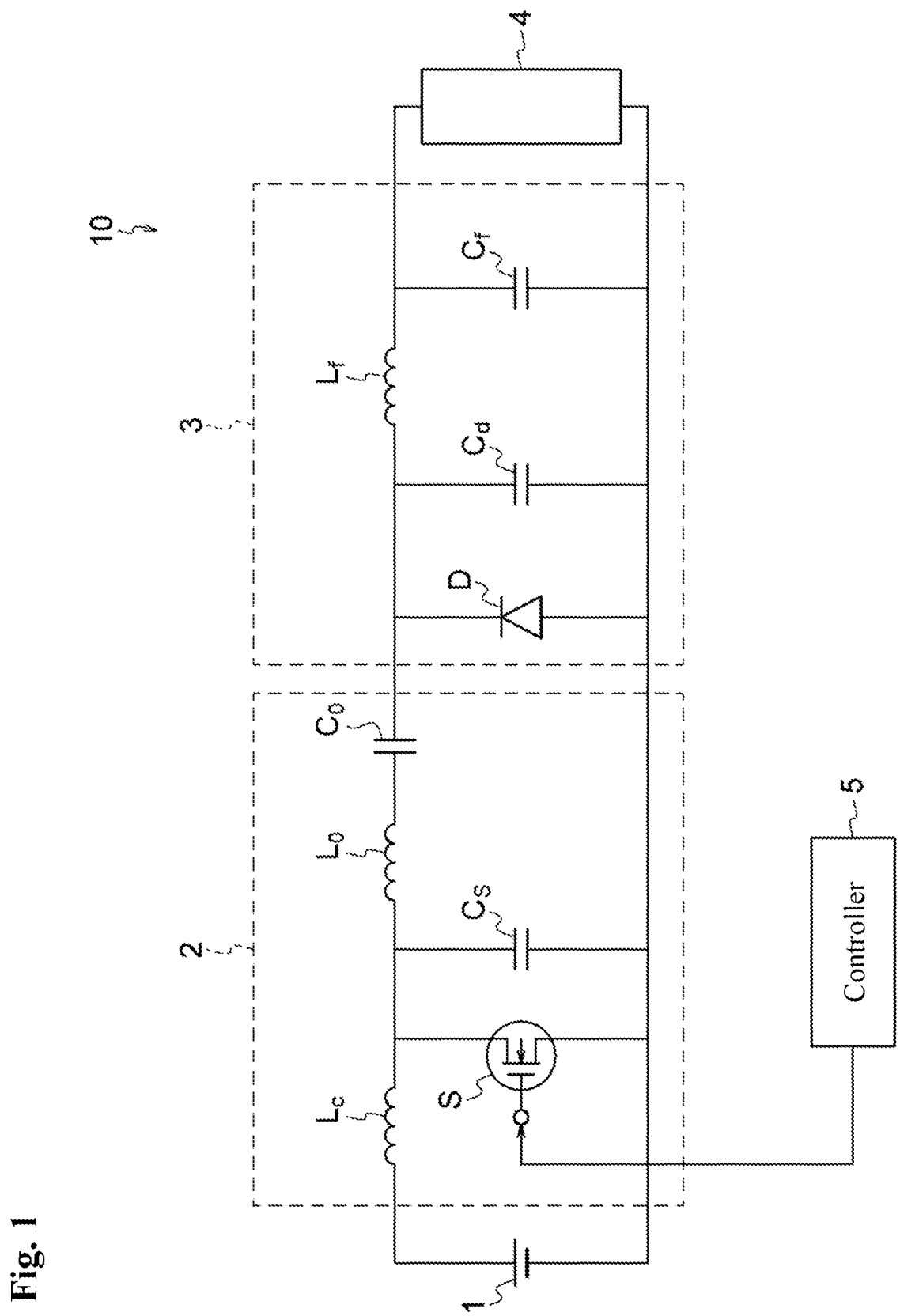
FIG. 1 is a diagram of a power-conversion system including a resonance-type power converter according to a first embodiment.

FIG. 1 is a diagram illustrating structure of a power-conversion system including a resonance-type power converter according to the first embodiment. The power-conversion system 10 according to the first embodiment is used for hybrid vehicles capable of driving using a motor as a drive source, and electric vehicles driving using a motor as a drive source, etc. Incidentally, situations where the power-conversion system 10 is used are not particularly limited.

As shown in FIG. 1, the power-conversion system 10 is a system for supplying DC power of an input-voltage source 1 converted by the DC-DC converter to a load 4. The DC-DC converter is configured by an inverter 2 and a rectifier 3, and performs control of output power according to a supply state of the power to the load 4.

The input-voltage source 1 generates and outputs DC power. For example, the input-voltage source 1 rectifies AC voltage (for example, 200V) input from a commercial power supply by a rectifier circuit (not shown in the figure), and converts to DC voltage by smoothing with a smoothing circuit (not shown in the figure). Then, conversion to DC voltage of the predetermined target voltage is performed by DC-DC converter (not shown in the figure). Incidentally, the structure of the input-voltage source 1 is not limited and any structure capable of outputting predetermine DC voltage can be used.

The inverter 2 convers DC voltage input from the input-voltage source 1 to AC voltage. The inverter 2 is a so-called class-E inverter that includes an input coil $L_c$, a switching element S, a shunt capacitor $C_s$, and a series resonant circuit consisting of a capacitor $C_0$ and a coil $L_0$.

The input coil $L_c$ is connected in series between an output terminal on a higher potential side of the input-voltage source 1 and a switching element S. Specifically, one end of the input coil $L_c$ is connected to the input-voltage source 1 and the other end of the input coil $L_c$ is connected to the switching element S. Since the input-voltage source 1 outputs certain DC voltage, the input coil $L_c$ supplies certain DC current to the switching element S. The input coil $L_c$ is a so-called choke coil.

The switching element S switches an ON state and an OFF state according to a control signal input from the controller 5. In the present embodiment, the switching element S is explained as a Metal Oxide Semiconductor Field Effect Transistor (MOSFET), but the switching element S is not particularly limited. The switching element S may be, for example, a bipolar transistor controllable by current, or Insulated Gate Bipolar Transistor (IGBT) controllable by voltage, etc. A drain terminal of the switching element S is connected to the other end of the input coil $L_c$. A source terminal of the switching element S is connected to an output terminal on a lower potential side of the input-voltage source 1. To a gate terminal of the switching element S, a control signal from the controller 5 is input. The control signal is a pulse signal that repeats a high level and a low level at a predetermined frequency. The predetermined frequency is a frequency for switching the switching element S, and in the following, also called as switching frequency $f_s$. When the control signal is at a low level, the switching element S becomes an OFF state and when the control signal is at a high level, the switching element S becomes an ON state.

Incidentally, when a function for operating diode is not available inside the switching element S, a diode that connects to the switching element S in parallel may be arranged. For example, a structure connecting an anode terminal of a diode to the source terminal of the switching element S and connecting a cathode terminal of the diode to the drain terminal of the switching element S may be used. By arranging such diode, the switching element S can be protected from a counter-electromotive force generated along with switching by the switching element S.

The shunt capacitor $C_s$ is a capacitor parallelly connected to the switching element S and that accumulates electric energy when the switching element S is in an OFF state. Then, after voltage at both ends the shunt capacitor $C_s$ reaches a peak, discharge is performed, and electric energy is released. At a timing voltage at both ends of the shunt capacitor $C_s$ reaches zero voltage, a state of the switching element S switches from the OFF state to ON state. Control of the switching element S by the controller 5 will be described in the following.

The coil $L_0$ and the capacitor $C_0$ are the series resonant circuit designed so that their resonance frequency matches with a switching frequency $f_s$. One end of the coil $L_0$ is connected to the drain terminal of the switching element S and the other end of the input coil $L_c$. The other end of the coil $L_0$ is connected to the other end of the capacitor $C_0$. The other end of the capacitor $C_0$ is connected to the rectifier 3 described later. Hereafter, for convenience of explanation, the series resonant circuit consisting of the coil $L_0$ and capacitor $C_0$ are explained as a resonant circuit. Because of the resonance characteristics of the resonant circuit, output voltage of the inverter 2 is represented by the shape of a sinusoidal wave whose period is a resonance frequency (switching frequency $f_s$).

The rectifier 3 is arranged to an output side of the inverter 2 and converts the AC voltage output from the inverter 2 to DC voltage. The rectifier 3 includes a diode D, a shunt capacitor $C_d$, coil $L_f$, and capacitor $C_f$, and is a so-called class-E rectifier.

The diode D is a diode that functions as a switching element. An anode terminal of the diode D is connected to the other end of the capacitor $C_0$ and a cathode terminal of the diode D is connected to an output terminal on the lower potential side of the input-voltage source 1.

The shunt capacitor $C_d$ is parallelly connected to the diode D.

The coil $L_f$ and the capacitor $C_f$ configures a low pass filter. One end of the coil $L_f$ is connected to the other end of the capacitor $C_0$, the anode terminal of the diode D, and one end of the shunt capacitor $C_d$. The capacitor $C_f$ is parallelly connected to the shunt capacitor $C_d$. One end of the capacitor $C_f$ is connected to the other end of the coil $L_f$, and the other end of the capacitor $C_f$ is connected to the output terminal on the lower potential side of the input-voltage source 1. The diode D performs half-rectifying operation and voltage rectified by the Diode D is converted to DC voltage by the low pass filter.

The DC voltage of the input-voltage source 1, converted by the DC-DC converter, is input to the load 4. The load 4, for example, is a battery including a secondary battery or the like. In the present embodiment, the load 4 is explained as a battery. Incidentally, the load 4 is not limited to a battery, and any that can accumulate DC power from the input-voltage source 1, or drivable by the DC power may be used.

The controller 5 includes a microcomputer including a Central Processing Unit (CPU), a Read Only Memory (ROM), and a Random Access Memory (RAM), and a Field-Programmable Gate Array (FPGA).

The controller 5 controls output power of the DC-DC converter. Specifically, the controller 5 generates a control signal for turning on and off the switching element S, and outputs to the gate terminal of the switching element S. For example, the controller 5 generates a pulse signal of the switching frequency $f_s$ based on a reference clock, amplifies the pulse signal to level capable of driving the switching element S in a drive circuit (not shown in the figure), and outputs to the gate terminal of the switching element S as a control signal. In this way, the switching element S is turned on or turned off. Incidentally, "turn-on" is an operation in which the switching element S switches from an OFF state to an ON state, an "turn-off" is an operation an operation in which the switching element S switches from an ON state to an OFF state.

In addition, from a current sensor (not shown in figure) that detects output current of the DC-DC converter, the detected value is input to the controller 5. The controller 5 performs feedback control based on an output current value. For example, based on the output current value, the controller 5 changes and adjusts frequency and duty ratio on the control signal. This allows the switching frequency $f_s$ and duty ratio of the switching element S to be changed to control the output power of the DC-DC converter. Incidentally, the duty ratio is a value indicating a ratio of an on period to a unit period when an on and off periods of the switching element S are defined as a unit period.

Further, the controller 5 generates a control signal that turns on the switching element S in a state where the voltage between the drain terminal and source terminal of the switching element S is zero voltage. In general, the switching element S has an on-resistance between the drain terminal and source terminal due to its internal structure. For this reason, when the switching element switches from an OFF state to ON state in a state the predetermined voltage is applied between both terminals of the switching element, power consumption due to the voltage between both terminals of the switching element and the on-resistance generates and the power-conversion efficiency of the inverter is reduced (also called as a switching loss).

As in the present embodiment, in the inverter 2 with the resonant circuit consisting of the coil $L_0$ and the capacitor $C_0$, the applied voltage between the drain terminal and the source terminal of the switching element S is represented by a sinusoidal voltage that varies over time due to the resonant characteristics of the resonant circuit. For this reason, for example, when the switching element S is turned on in a state where the voltage between the drain terminal and source terminal is zero voltage, power consumption generated by the switching element S is greatly reduced, improving power-conversion efficiency of the inverter 2. In the following explanation, for convenience of explanation, such operation of the switching element S is also called as Zero Voltage Switching (ZVS), zero voltage switching, or soft switching. Incidentally, operation of ZVS or the like includes operation in which the switching element S turns is turned off in a state where the voltage between the drain terminal and source terminal is zero voltage.

Figure 2:
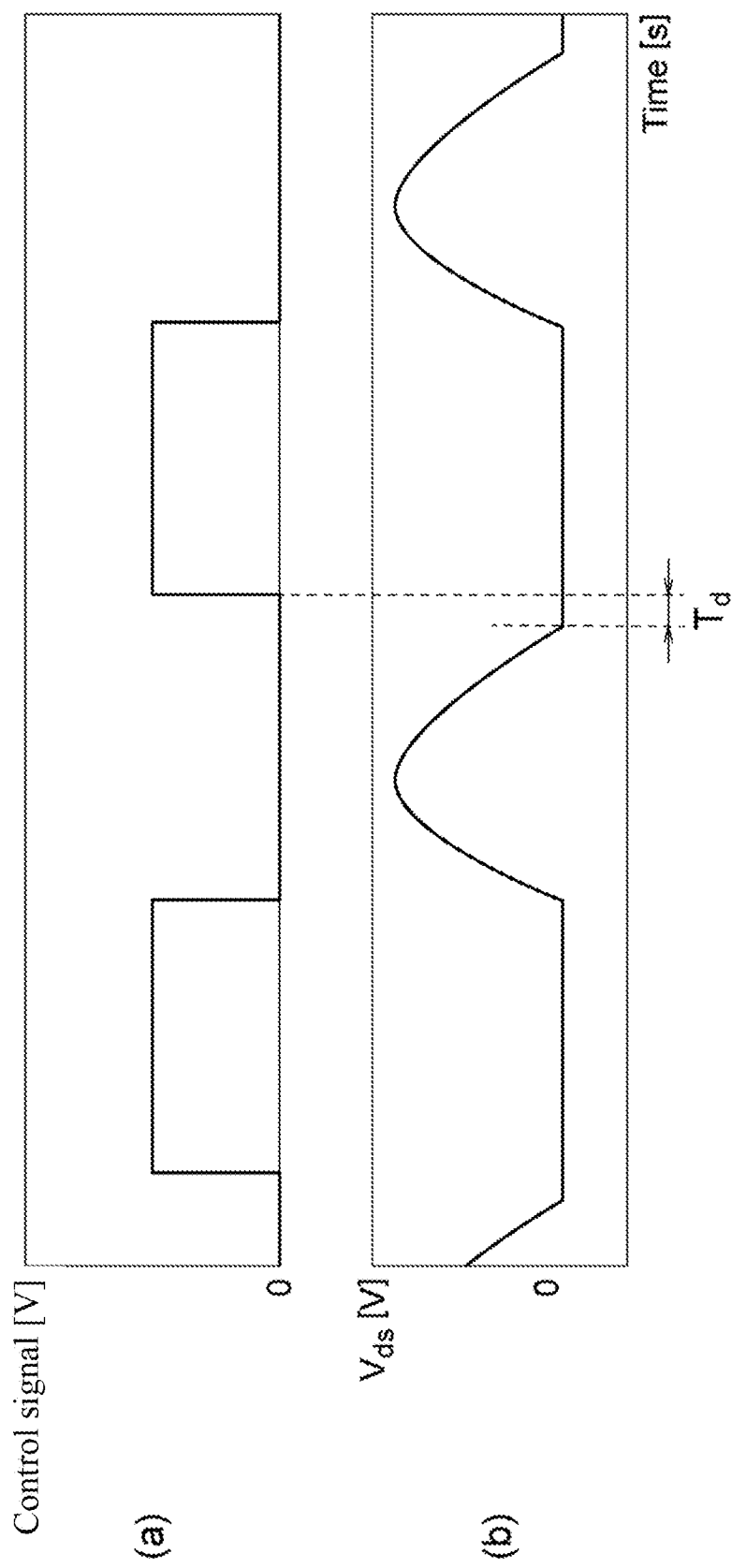
FIG. 2 is an example of a control signal output by a controller.

In addition, the controller 5 controls a timing of turning on the switching element when performing soft switching of the switching element S. Specifically, as shown in FIG. 2, the controller 5 generates a control signal so as to delay turn on of the switching element S for the predetermined delay time $T_d$ ($T_d>0$) after the voltage between the drain terminal and source terminal reaches zero voltage due to sinusoidal voltage. At the timing when the switching element is turned on, the voltage at both ends of the switching element is maintained at zero voltage. Incidentally, FIG. 2 is an example of a control signal output by the controller 5. FIG. 2(A) illustrates a control signal output by the controller 5 to the gate terminal of the switching element S, and FIG. 2(B) illustrates voltage $V_{ds}$ between the drain terminal and source terminal of the switching element S.

As a method for controlling delay time $T_d$, a method of changing frequency of the control signal, a method of changing a duty ratio of the control signal, or a combination of these methods may be mentioned. For example, when the preset delay time $T_d$ is stored in ROM or RAM according to the detected value from the current sensor, the controller 5 read the delay time $T_d$ corresponding to the output current value and changes the frequency and duty ratio. For example, when the duty ratio of the control signal is reduced, the off period increases to the extent that the on period decreases. As a result, the timing of the switching element S switching from off to on can be delayed and the delay time $T_d$ can be increased. Conversely, when the duty ratio of the control signal is increased, the timing of the switching element S switching from off to on can be earlier and the delay time $T_d$ can be reduced.

In addition, in the present embodiment, the controller 5 secures the delay time $T_d$ in a range of a predetermined switching frequency $f_s$. Specifically, the controller 5 secures the delay time $T_d$ in a range where the switching frequency $f_s$ is higher than a series resonance frequency $f_{r1}$ ($f_s>f_{r1}$). The series resonance frequency $f_{r1}$ is a resonance frequency of the resonant circuit consisting of the coil $L_0$ and capacitor $C_0$ when the switching element S is in an ON state and can be represented by the following formula (1).

[Numeral 1]

$$f_{r1} = \frac{1}{2\pi\sqrt{L_0 C_0}} \quad (1)$$

Wherein, $f_{r1}$ represents a value of the series resonance frequency $f_{r1}$, $L_0$ represents a value of inductance of the coil $L_0$, and $C_0$ represents a value of the capacity of the capacitor $C_0$.

Figure 3:
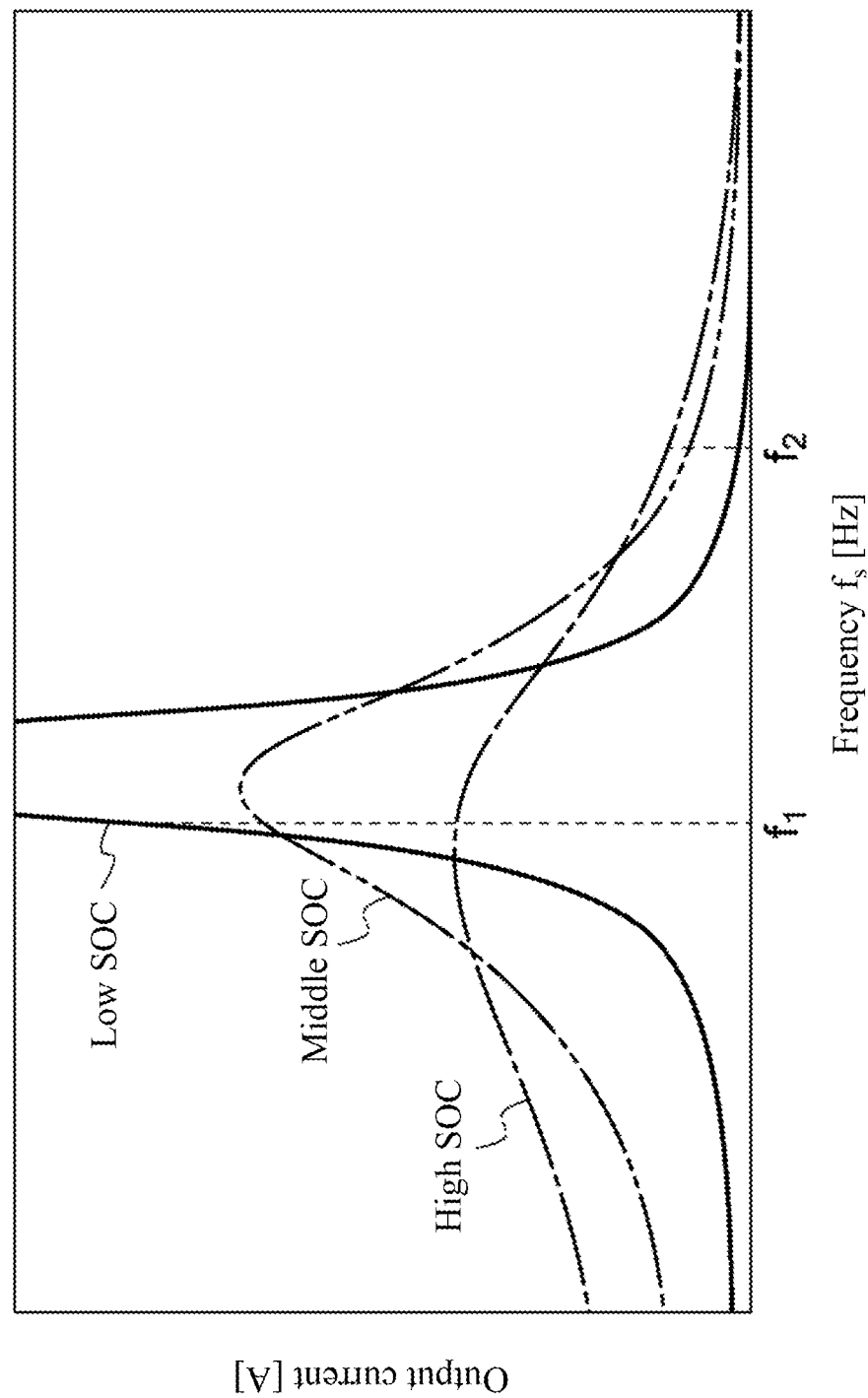
FIG. 3 is an example of a relationship between output current of a DC-DC converter and a frequency of a switching element according to a reference example.
Figure 4:
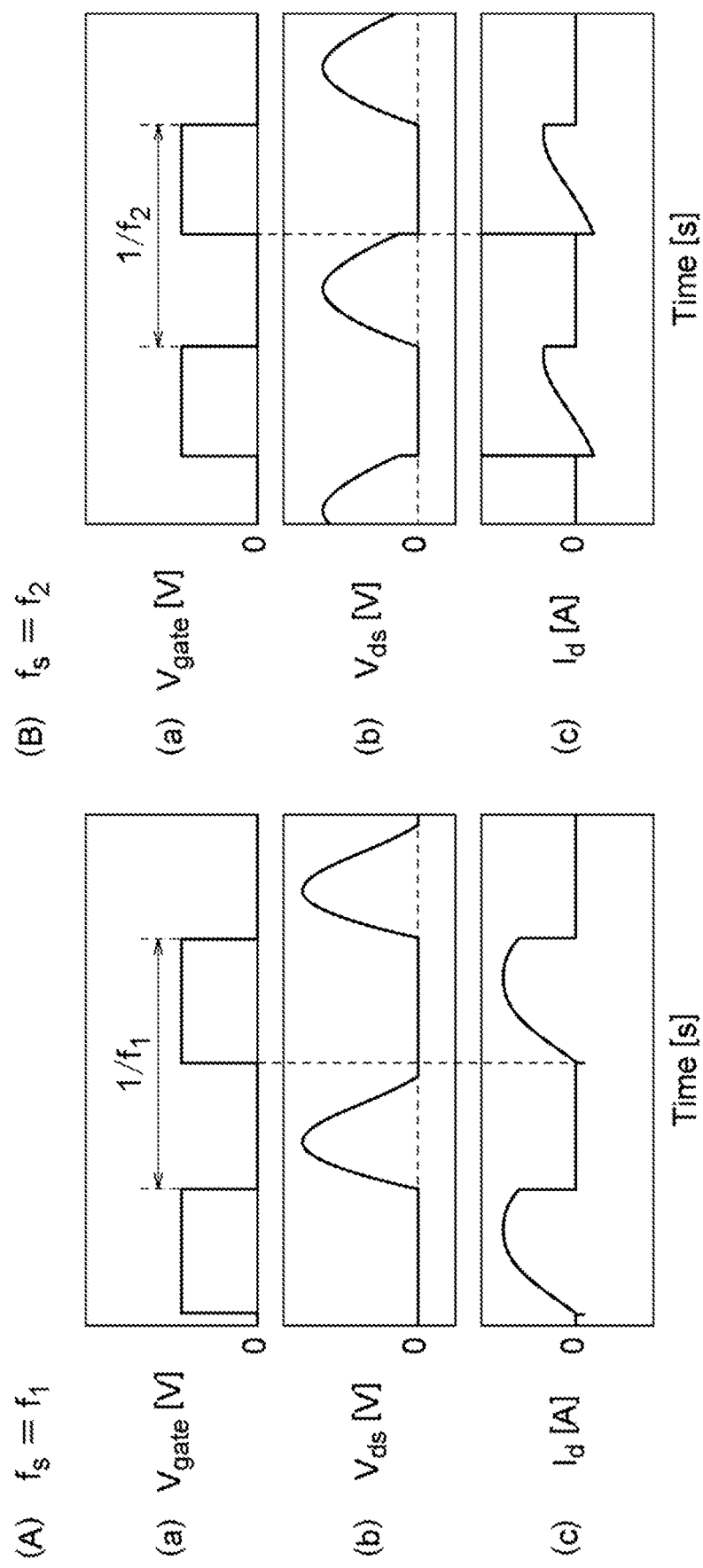
FIG. 4 is an example of a relationship between switching frequency and soft switching in the reference example.

Here, by referencing FIG. 3 and FIG. 4, a relationship between the method for controlling the output power of the DC-DC converter and soft switching is explained using a reference example. FIG. 3 is an example of a relationship between the output current of the DC-DC converter and frequency of the switching element according to the reference example. FIG. 3 is an example of using a battery as a load (corresponds to the load 4 in the present embodiment) and shows characteristics of each state of SOC. Incidentally, the state of SOC is shown in three levels according to the value of SOC (high SOC, middle SOC, and low SOC). The DC-DC converter according to the reference example has a same configuration except that the controller does not include a function for securing the delay time $T_d$ compared to the DC-DC converter according to the present embodiment.

As shown in FIG. 3, in general, in a DC-DC converter with a class-E inverter, output power is controlled by controlling the switching frequency. For example, when charging a battery at a maximum output current (in case of heavy load), the controller of the reference example generates a control signal such that the switching frequency $f_s$ is a frequency $f_1$. On the other hand, when the output current is reduced from the maximum output current because the charge of the battery, which is the load, is approaching full charge (in case of a light load), the controller of the reference example controls the frequency of a control signal higher than the frequency $f_1$. For example, the controller of the reference example generates a control signal such that the switching frequency $f_s$ is a frequency $f_2$ (>frequency $f_1$).

FIG. 4 is a figure corresponding to FIG. 3 and shows an example of a relationship between the switching frequency $f_s$ and soft switching in the reference example. FIG. 4(A) illustrates operation of the switching element in the reference example at the frequency $f_1$ shown in FIG. 3, and FIG. 4(B) illustrates operation of the switching element in the reference example at the frequency $f_2$ shown in FIG. 3. In FIGS. 4(A) and 4(B), (a) to (c) illustrate states of the switching element of the reference example. (a) illustrates gate voltage $V_{gate}$, (b) illustrates voltage $V_{ds}$ between the drain terminal and source terminal, and (c) illustrates drain current $I_d$.

In the case of heavy load, the controller of the reference example generates a control signal corresponding to the frequency $f_1$ illustrated in FIG. 3(A) and outputs to the switching element. In this case, as shown in FIG. 4(A), after the voltage $V_{ds}$ reaches zero voltage, the gate voltage $V_{gate}$ begins to rise The drain current $I_d$ does not flow when the gate voltage $V_{gate}$ begins to rise, and the switching element of the reference example performs soft switching.

On the other hand, in the case of light load, the controller of the reference example generates a control signal corresponding to the frequency $f_2$ shown in FIG. 3(B) and outputs to the switching element in order to reduce the output current. When the frequency of the control signal is higher than the frequency $f_1$, the timing of the switching element switching from off to on is earlier compared to the timing in the case of frequency $f_1$. becomes earlier compared to the timing when the frequency of the control is frequency $f_1$. In this case, as shown in FIG. 4(B), before the voltage $V_{ds}$ reaches zero voltage, that is, before discharge of the electric charge accumulated in a shunt capacitor $C_s$ finishes, the gate voltage $V_{gate}$ rises. Drain current $I_d$ flows with the gate voltage $V_{gate}$ begins to rise, and the switching element of the reference example cannot perform operation of soft switching. This is because the controller of the reference example simply increased the frequency of the control signal to reduce the output current without securing the delay time $T_d$.

As mentioned above, because the controller of the reference example does not secure the delay time $T_d$, the switching element can only perform operation of soft switching within a range of switching frequency $f_s$, and power-conversion efficiency cannot be improved.

In contrast, the controller of the present embodiment secures the delay time $T_d$ in a predetermined range of switching frequency $f_s$ ($f_s > f_{r1}$), as described above. This allows the switching element S to operate soft switching in a wide range of the switching frequency $f_s$ compared to the DC-DC converter of the reference example. As a result, power-conversion efficiency can be improved.

Figure 5:
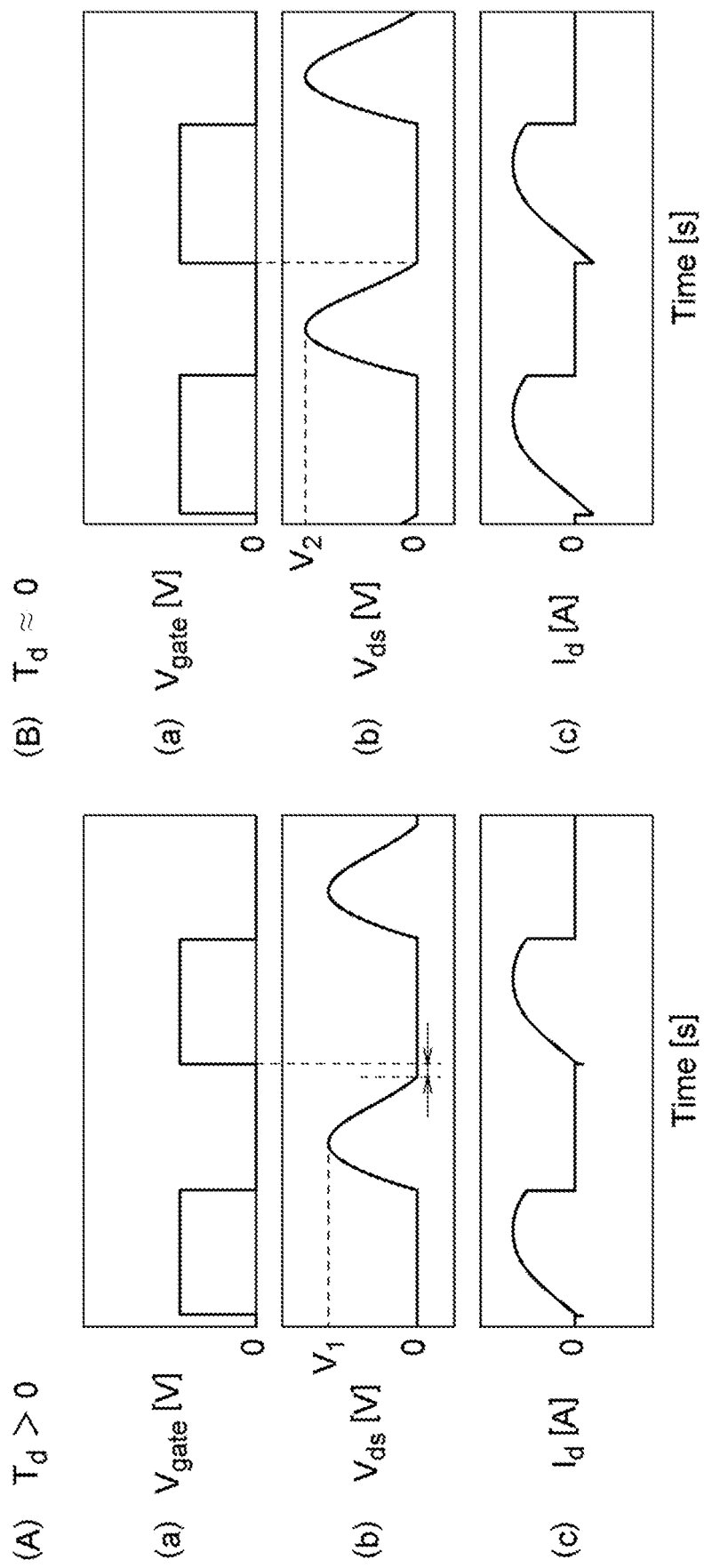
FIG. 5 is an example of a relationship between delay time and applied voltage to a switching element.

Next, by referencing FIG. 5, a relationship between delay time $T_d$ and applied voltage to the switching element is explained. FIG. 5 is an example showing a relationship between the delay time $T_d$ and the applied voltage to the switching element S. FIG. 5(A) illustrates operation of the switching element when the delay time $T_d$ is greater than zero, and FIG. 5(B) illustrates operation of the switching element when the delay time $T_d$ is around zero ($T_d \approx 0$). In FIGS. 5(A) and (B), (a) to (c) illustrate states of the switching element. (a) illustrates the gate voltage $V_{gate}$, (b) illustrates voltage $V_{ds}$ between the drain terminal and source terminal, and (c) illustrates drain current $I_d$. Incidentally, in FIGS. 5(A) and (B), each DC-DC converter outputs the same output power.

As a control to operate the switching element S shown in FIG. 5(B), for example, control of $E^2$-level DC-DC converter that calculates a switching frequency and duty ratio, makes the switching element soft switching and controls a constant voltage is known (Non-patent Document 1: Technical Group on Nonlinear Problems, The Institute of Electronics, Information and Communication Engineers (IEICE), vol. 114, no. 414, pp. 143-146, January 2015). In the control of the DC-DC converter described in Non-patent Document 1, the switching element operates as shown in FIG. 5(B) because the delay time $T_d$ is not secured.

Regarding the voltage $V_{ds}$, comparing FIG. 5(A) and FIG. 5(B), the maximum voltage value of the voltage $V_{ds}$ is voltage $V_2$ when the delay time $T_d$ is around zero, as shown in FIG. 5(B). In contrast, the maximum voltage value of the voltage $V_{ds}$ is voltage $V_1$ that is lower than the voltage $V_2$ ($V_1 < V_2$) when the delay time $T_d$ is greater than zero, as shown in FIG. 5(A). In other words, by securing the value of the delay time $T_d$ greater than zero, the voltage $V_{ds}$ between the drain terminal and source terminal of the switching element S (also called as applied voltage to the switching element S) can be suppressed. This is because, by making the delay time $T_d$ greater than zero, the on period of the switching element S is decreased and a charge quantity accumulated to the shunt capacitor $C_s$ is decreased. Incidentally, in the present embodiment, the controller 5 sets the delay time within a range shown in the following formula (2) according to the load 4 or other circuit designs.

[Numeral 2]

$$0 < T_d < \frac{1}{2f_s} \quad (2)$$

Wherein, $T_d$ represents a value of the delay time $T_d$, and $f_s$ represents a switching frequency of the switching element S.

As mentioned above, in the present embodiment, by controlling at least either one of the switching frequency or the duty ratio of the switching element S, the delay time $T_d$ is secured, and the switching element S is turned on within the delay time $T_d$. This can expand a range of the switching frequency $f_s$ capable of soft switching and improve the power-conversion efficiency of the DC-DC converter. In addition, since the applied voltage to the switching element S can be suppressed, the element with a low withstand voltage can be included in the selection target when the switching element S is selected, and the cost of the DC-DC converter can be reduced.

In addition, in the present embodiment, when the switching frequency $f_s$ is a frequency higher than the series resonance frequency $f_{r1}$, by controlling at least either one of the switching frequency or the duty ratio of the switching element S, delay time $T_d$ can be secured. This allows the switching element S to perform soft switching while suppressing the applied voltage to the switching element S, even when the switching frequency $f_s$ is increased to reduce output power of the DC-DC converter. As a result, the cost and efficiency of the DC-DC converter can be reduced and improved.

Further, in the present embodiment, a detected value is acquired from a current sensor that detects the output current of the DC-DC converter, and a delay time $T_d$ is secured based on the output current value. This allows the cost of the DC-DC converter to be reduced without the need to provide a high-precision current sensor around the switching element S to detect the drain current of the switching element S.

Second Embodiment

Next, a method for controlling the DC-DC converter according to the second embodiment will be explained. In the power-conversion system according to the present embodiment, except that the method for controlling the DC-DC converter by the controller 15 differs from the embodiment described above, the same configuration as the DC-DC converter according to the above-mentioned embodiment is included and the explanations in the above embodiment are accordingly referenced.

Figure 6:
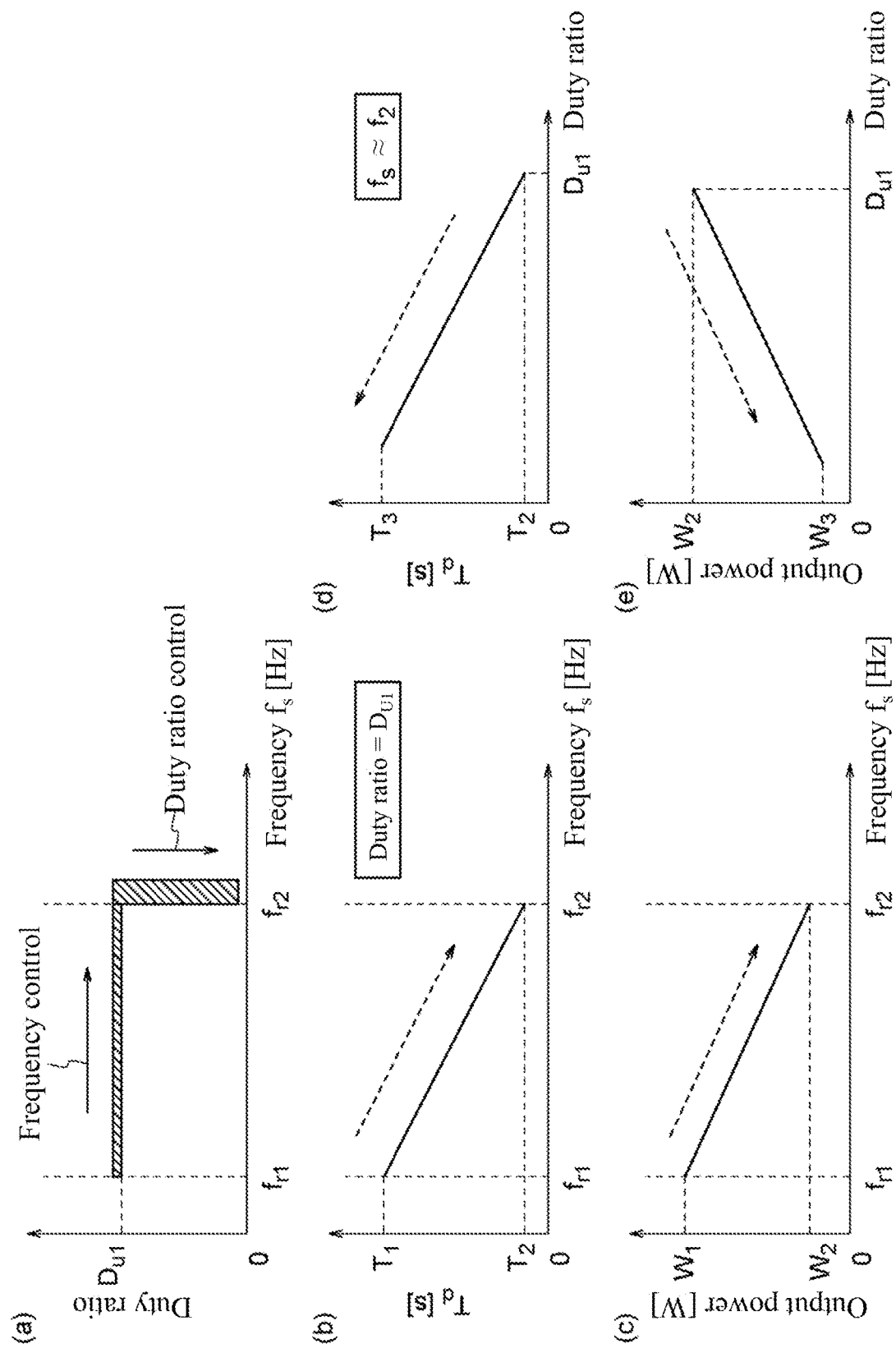
FIG. 6 is an example of a method for controlling the DC-DC converter according to a second embodiment.

Referencing FIG. 6, a control method by the controller 15 when reducing the output power of the DC-DC converter will be explained. FIG. 6 is an example of a method for controlling the DC-DC converter according to the second embodiment. As shown in FIG. 6(a), the controller 15 reduces the output power of the DC-DC converter while securing that delay time $T_d$ is greater than or equal to a predetermined value by controlling the switching frequency $f_s$ when the switching frequency $f_s$ satisfies the following formula (3).

[Numeral 3]

$$f_{r1} < f_s < f_{r2} \quad (3)$$

Wherein, $f_s$ represents a value of the switching frequency of the switching element S, $f_{r1}$ represents a value of a series resonance frequency (see the above formula (1)), and $f_{r2}$ represents a frequency value of a parallel resonance frequency.

Further, the parallel resonance frequency $f_{r2}$ is a resonance frequency in the OFF state of the switching element S, which is the resonant frequency of the resonant circuit consisting of the coil $L_0$, the capacitor $C_0$, and shunt capacitor $C_s$, and is shown in formula (4) below.

[Numeral 4]

$$f_{r2} = \cfrac{1}{2\pi\sqrt{\cfrac{L_0 C_s C_0}{C_s + C_0}}} \quad (4)$$

Wherein, $f_{r2}$ represents a value of a parallel resonance frequency, $L_0$ represents an inductance value of the coil $L_0$, and $C_s$ represents a value of the capacity of the shunt capacitor $C_s$.

Next, a specific control method will be explained using FIG. 6(b) and FIG. 6(c). FIG. 6(b) is an example showing a relationship between the delay time $T_d$ and the switching frequency $f_s$, and FIG. 6(c) is an example showing a relationship between the output power and the switching frequency $f_s$ of the DC-DC converter.

As shown in FIG. 6(b), when the switching frequency $f_s$ is higher than the series resonance frequency $f_{r1}$ and lower than a parallel resonance frequency $f_{r2}$, the controller 15 fixes the duty ratio to a predetermined value (for example, duty ratio=$D_{U1}$), and step-wisely reduces the output power of the DC-DC converter by step-wisely increasing the switching frequency $f_s$.

For example, first the controller 15 sets a duty ratio when starting the control (for example, Dui) in order to make the delay time $T_d$ secure predetermined time even when the switching frequency $f_s$ is increased to a parallel resonance frequency $f_{r2}$. The controller 15, for example, estimates a delay time $T_d$ capable of soft switching when the switching frequency $f_s$ is a parallel resonance frequency $f_{r2}$. The controller 15 can set a duty ratio when starting the control by calculating a delay time delay time $T_d$ when starting the control based on the estimated result. Then, when the output power of the DC-DC converter needs to be reduced, the controller 15 fixes the duty ratio to $D_{U1}$ and increases the switching frequency $f_s$ from a series resonance frequency $f_{r1}$ to the parallel resonance frequency $f_{r2}$ by step-wisely increasing the frequency of the control signal in a fixed period unit based on the output current value. FIG. 6(b) shows that the delay time $T_d$ is reduced from a time $T_1$ to a time $T_2(<T_1)$ according to the switching frequency $f_s$ when the switching frequency $f_s$ is increased from the series resonance frequency $f_{r1}$ to the parallel resonance frequency $f_{r2}$. Each of the time $T_1$ and the time $T_2$ is a time that satisfy the above formula (2). The constant period of increasing the frequency (corresponding to the slope shown in FIG. 6(b)) is preferably set accordingly based on the output current value.

In addition, when the switching frequency $f_s$ is increased, as shown in FIG. 6(c), the output power is reduced as the output current of the DC-DC converter is reduced. FIG. 6(c) shows that the output power reduces from power $W_1$ to power $W_2$ ($<W_1$) when the switching frequency $f_s$ is increased from the series resonance frequency $f_{r1}$ to the parallel resonance frequency $f_{r2}$.

Next, a method for controlling the DC-DC converter by the controller 15 after the switching frequency $f_s$ reaches the parallel resonance frequency $f_{r2}$ is explained.

As shown in FIG. 6(a), the controller 15 controls a duty ratio when the switching frequency $f_s$ satisfies the following formula (5) as a result of step-wisely increasing the frequency of the control signal. The controller 15 reduces the output power of the DC-DC converter while securing the delay time $T_d$ greater than or equal to a predetermined value.

[Numeral 5]

$$f_s \approx f_{r2} \quad (5)$$

Wherein, $f_s$ represents a value of the switching frequency of the switching element, $f_{r2}$ represents a value of the frequency of the parallel resonance frequency $f_{r2}$ (see the above formula (4)).

Using FIG. 6(d) and FIG. 6(e), specific control method will be explained. FIG. 6(d) is an example showing a relationship between the delay time $T_d$ and duty ratio, and FIG. 6(e) is an example of a relationship between the output power and duty ratio of the DC-DC converter.

When the switching frequency $f_s$ reaches around the parallel resonance frequency $f_{r2}$, as shown in FIG. 6(d), the controller 15 fixes the switching frequency $f_s$ to a predetermined frequency value (for example, switching frequency $f_s \approx f_{r2}$), and further reduces the output power of the DC-DC converter by step-wisely decreasing the duty ratio. FIG. 6(d) shows that the delay time $T_d$ increases from time $T_2$ to time $T_3(>T_2)$ according to the duty ratio when the duty ratio is reduced from $D_{U1}$ to $D_{U2}$. Time $T_3$ is a value that satisfies the above formula (2). The constant period of reducing the duty ratio (corresponding to the slope shown in FIG. 6(d)) is preferably set accordingly based on the output current value.

In addition, when the duty ratio is reduced, as shown in FIG. 6(e), the output power is reduced as the output current of the DC-DC converter is reduced. This is because, along with decrease in the duty ratio, the on period of the switching element S decreases and a charge quantity accumulated to the shunt capacitor $C_s$ is decreased. FIG. 6(e) shows that the output power decreases from power $W_2$ to power $W_3(<W_2)$ according to the duty ratio when the duty ratio is decreased from $D_{U1}$ to $D_{U2}$.

Figure 7:
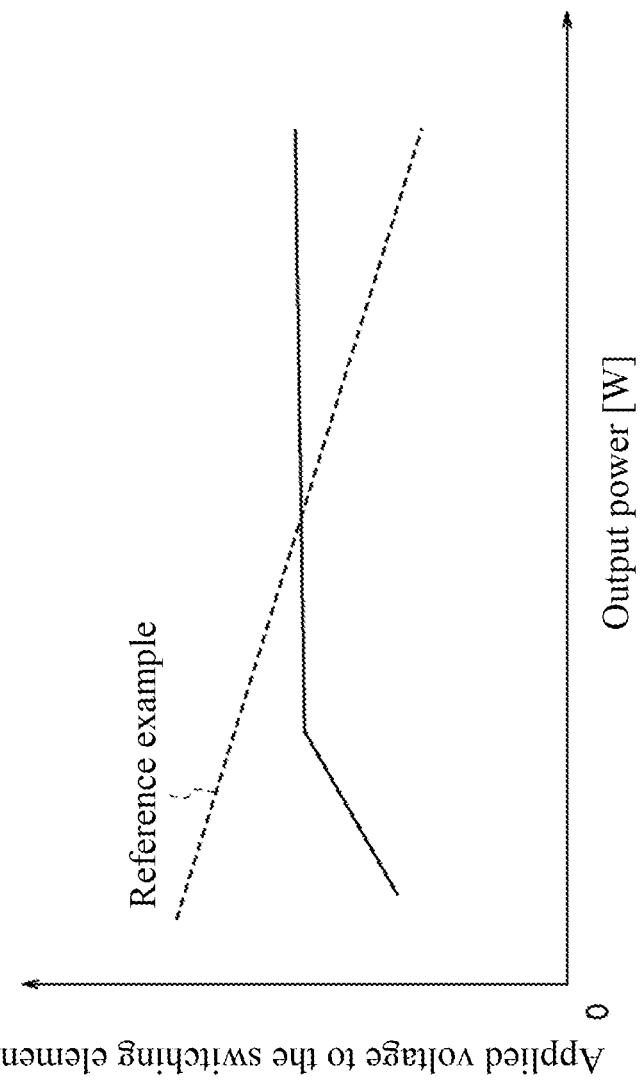
FIG. 7 is an example of a relationship between output power of the DC-DC converter according to the second embodiment and applied voltage to the switching element.

As mentioned above, in the present embodiment, when the switching frequency $f_s$ satisfies the above formula (3), by fixing the duty ratio to a predetermined value and also increasing the switching frequency $f_s$, the output power of the DC-DC converter is reduced. Then, when the increased switching frequency $f_s$ satisfies the above formula (5), the switching frequency $f_s$ is fixed to a value around the parallel resonance frequency fa and by reducing the duty ratio, the output power of the DC-DC converter is reduced. As shown in FIG. 7, this allows the applied voltage to the switching element S to be suppressed compared to the DC-DC converter of the reference example, even when the output power of the DC-DC converter is reduced. Incidentally, FIG. 7 is an example showing a relationship between the output power of the DC-DC converter according to the second embodiment and the applied voltage to the switching element S. FIG. 7 shows a relationship between the output power of the DC-DC converter where the delay time $T_d$ is not secured and the applied voltage to the switching element S in a dotted line as a reference example.

In addition, in the present embodiment, a duty ratio when starting control of the switching frequency $f_s$ is set so that the delay time $T_d$ is secured for a predetermined time even when the switching frequency $f_s$ is increased to the parallel resonance frequency $f_{r2}$ This prevents unnecessary control of the duty ratio to secure the delay time $T_d$ in the range of frequencies until the switching frequency $f_s$ reaches the parallel resonance frequency $f_{r2}$. In addition, in a wide range of switching frequencies $f_s$, the switching element S can be made to operate soft switching and the applied voltage to the switching element S can be suppressed.

Third Embodiment

Next, a method for controlling a DC-DC converter according to a third embodiment will be explained. In the DC-DC converter according to the present embodiment, except that the method for controlling the DC-DC converter by the controller 25 differs from the embodiments described above, the same configuration as the DC-DC converter according to the above-mentioned embodiments is included and the explanations in the above embodiments are accordingly referenced.

Figure 8:
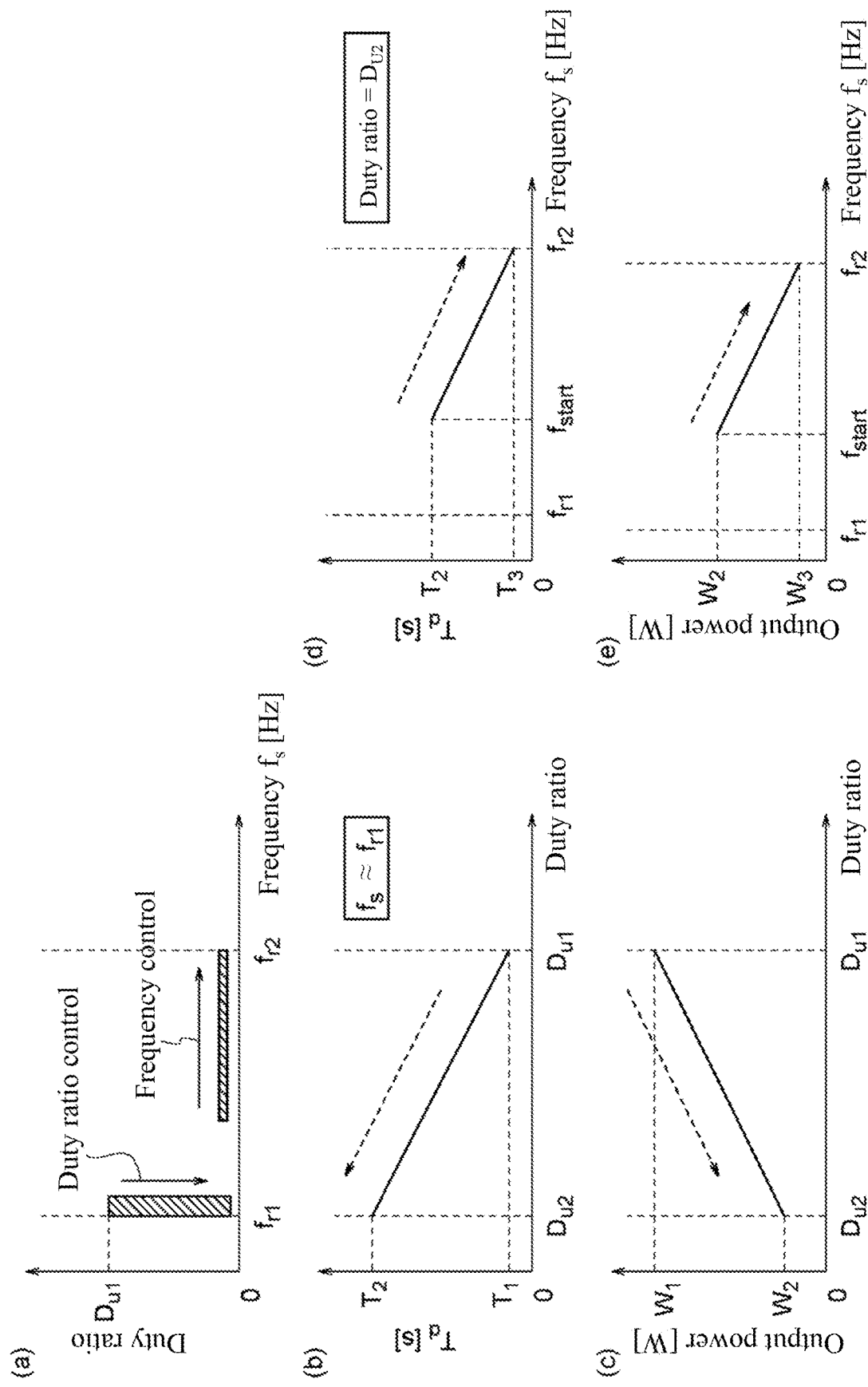
FIG. 8 is an example of a method for controlling the DC-DC converter according to a third embodiment.

Using FIG. 8, a method for controlling the DC-DC converter by the controller 25 when the output power of the DC-DC converter is reduced is explained. FIG. 8 is an example of a method for controlling the DC-DC converter according to the third embodiment. In the present embodiment, the output power of the DC-DC converter is reduced in the order control opposite to the order of control described in the second embodiment. In other words, in the present embodiment, first, the output power is reduced by controlling the duty ratio and then the output power is reduced by controlling frequency.

As shown in FIG. 8(a), when the switching frequency $f_s$ satisfies the above formula (3), the controller 25 reduces the output power of the DC-DC converter while securing the delay time $T_d$.

Next, specific control method is explained with reference to FIG. 8(b) and FIG. 8(c). FIG. 8(b) is an example of a relationship between the delay time $T_d$ and duty ratio, and FIG. 8(e) is an example of a relationship between the output power and duty ratio of the DC-DC converter.

As shown in FIG. 8(b), when the switching frequency $f_s$ is higher than the series resonance frequency $f_{r1}$ and lower than the parallel resonance frequency $f_{r2}$, the controller 25 fixes the switching frequency to a predetermined frequency value (for example, switching frequency $f_s \approx f_{r1}$), and step-wisely reduces the output power of the DC-DC converter by step-wisely decreasing the duty ratio. FIG. 8(b) shows that the delay time $T_d$ increases from time $T_1$ to time $T_2(>T_1)$ according to the duty ratio when the duty ratio is reduced from $D_{U1}$ to $D_{U2}$. Each of time $T_1$ and time $T_2$ is a value that satisfy the above formula (2). The constant period of decreasing the duty ratio (corresponding to the slope shown in FIG. 8(b)) is preferably set accordingly based on the output current value.

In addition, when the duty ratio is reduced, as shown in FIG. 8(c), the output power is reduced as the output current of the DC-DC converter is reduced. FIG. 8(c) shows that the output power reduces from power $W_1$ to power $W_2$ ($<W_1$) according to the duty ratio when the duty ratio is reduced form the duty ratio $D_{U1}$ to $D_{U2}$.

Next, a method for controlling the DC-DC converter by the controller 25 after the duty ratio reaches a predetermined value is explained.

When the duty ratio reaches a predetermined value, as shown in FIG. 8(d), the controller 25 fixes the duty ratio to a predetermined value (for example, duty ratio $D_{U2}$), and further reduces the output power of the DC-DC converter by step-wisely increasing the switching frequency $f_s$. FIG. 8(d) shows that the output power decreases from the power $W_2$ to power $W_3$ ($<W_2$) according to the switching frequency $f_s$. when the switching frequency $f_s$ is increased from a frequency $f_{start}$ to a parallel resonance frequency $f_{r2}$. Incidentally, the frequency $f_{start}$ represents a frequency set again when starting the frequency control. The frequency $f_{start}$ is the frequency for making the output power the DC-DC converter when starting the frequency control to the same power as the output power of the DC-DC converter when finishing the duty ratio control.

In addition, when the switching frequency $f_s$ is increased, as shown in FIG. 8(e), the output power is reduced as the output current of the DC-DC converter is reduced. FIG. 8(e) shows that the output power reduces form the power $W_2$ to power $W_3$($<W_2$) according to the switching frequency $f_s$ when the switching frequency $f_s$ is increased from the frequency $f_{start}$ to the parallel resonance frequency $f_{r2}$.

As mentioned above, in the present embodiment, when the switching frequency $f_s$ satisfies the above formula (3), the switching frequency $f_s$ is fixed to a predetermined frequency and the output power of the DC-DC converter is reduced by reducing the duty ratio. Then, when the duty ratio reduces to the predetermined value, by fixing the duty ratio and increasing the switching frequency $f_s$, the output power of the DC-DC converter is reduced. This allows the noise generated by the switching of the switching element S, or the so-called switching noise, to be predicted because the switching frequency $f_s$ is fixed at heavy load. As a result, the design of the noise filter can be simplified.

Fourth Embodiment

Next, a method for controlling a DC-DC converter according to the fourth embodiment is explained. In the power-conversion system according to the present embodiment, except that the method for controlling the DC-DC converter by the controller 35 differs from the embodiments described above, the same configuration as the DC-DC converter according to the above-mentioned embodiments is included and the explanations in the above embodiments are accordingly referenced.

Figure 9:
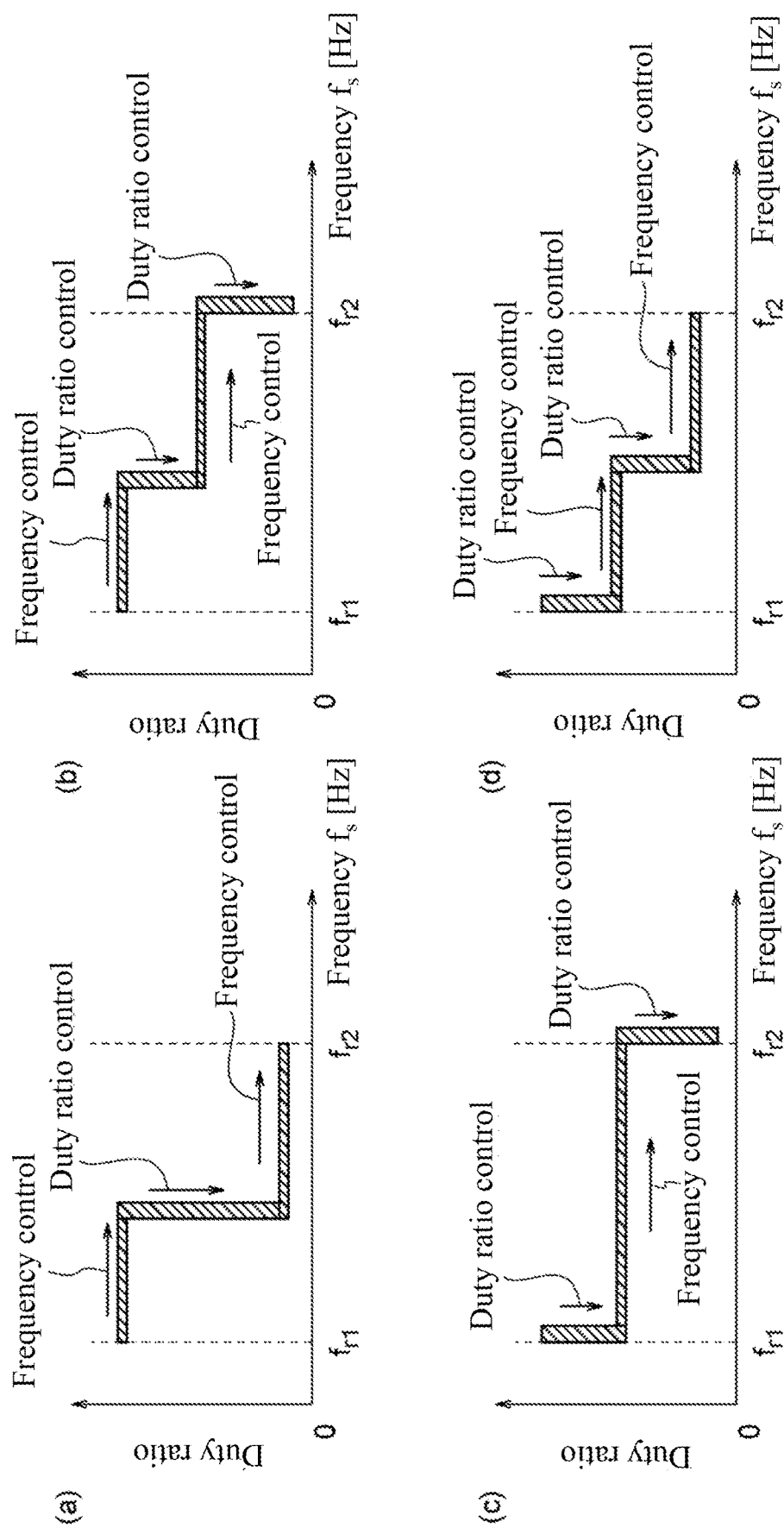
FIG. 9 is an example of a method for controlling the DC-DC converter according to a fourth embodiment.

Referencing FIG. 9, a control method by the controller 35 when reducing the output power of the DC-DC converter will be explained. FIG. 9 is an example of a method for controlling the DC-DC converter according to the fourth embodiment.

In the present embodiment, when reducing the output the power of the DC-DC converter, the controller 35 repeatedly performs a frequency control for controlling the switching frequency $f_s$ and duty ratio control for controlling the duty ratio of the switching element S. Specifically, the controller 35 fixes the duty ratio and increases the switching frequency $f_s$ in the frequency control, and fixes the switching frequency $f_s$ and decreases the duty ratio in the duty ratio control. Also, the controller 35 performs each control in a range of switching frequency $f_s$ that is from a series resonance frequency $f_{r1}$ to around the parallel resonance frequency $f_{r2}$. Additionally, the controller 35 performs each control so as to make the delay time $T_d$ satisfy the above formula (2).

An example of a control method shown in FIG. 9(a) to FIG. 9(d) is explained. For example, as shown in FIG. 9(a), the controller 35 may reduce the output power by starting with frequency control, then performing duty ratio control, and finally performing frequency control. In addition, for example, as shown in FIG. 9(b), the controller 35 may reduce the output power by starting with frequency control, then performing in the order of duty ratio control and frequency control, and finally performing duty ratio control. Furthermore, for example, as shown in FIG. 9(c), the controller 35 may reduce the output power by starting with duty ratio control, then performing frequency control, and finally performing duty ratio control. In addition, for example, as shown in FIG. 9(d), the controller 35 may reduce the output power by starting with duty ratio control, then performing in the order of frequency control and duty ratio control, and finally performing frequency control. Incidentally, the control method shown in FIG. 9(a) to FIG. 9(d) is an example of a method for repeatedly performing frequency control and duty ratio control, and the number of times of frequency control and duty ratio control is not limited. If the delay time $T_d$ satisfies the above formula (2), the number of times of each control may be increased than the number of times of each control shown in FIG. 9(a) to FIG. 9(d).

As mentioned above, in the present embodiment, the output power of the DC-DC converter is reduced by alternately repeating increase of the switching frequency $f_s$ while fixing the duty ratio and decrease of the duty ratio while fixing the switching frequency $f_s$, the output power of the DC-DC converter is reduced. This allows soft switching to be performed in accordance with the application over a wide range of switching frequency $f_s$ while controlling the applied voltage to the switching element S, even if the application using the power-conversion system 10 is changed. As a result, the cost and efficiency of the DC-DC converter can be reduced and improved in various applications.

Incidentally, the embodiments explained above are described for easy understanding of the present invention, and are not for limiting the present invention. Accordingly, each element disclosed in the embodiments is intended to include all design changes and equivalents that correspond to the technical scope of the present invention.

For example, in the above-described embodiments, the case of a resonance-type power converter mounted on a DC-DC converter has been described as an example, but the present invention is not limited to the same. For example, a DC-AC inverter configured only by an inverter 2 without a rectifier 3 may be used.

Also, for example, in the above embodiments, as a rectifier 3, a class-E rectifier circuit is used as an example, however, the rectifier is not limited thereto and a full-wave rectifier circuit may be used. This enables the rectification action to be realized with a general-purpose and simple circuit configuration, thus further lowering the cost of the resonance-type power converter. Incidentally, the rectifier 3 may be a synchronous rectifier circuit.

Furthermore, in the present embodiments, a method for securing a delay time $T_d$ based on a detected value from the current sensor detecting the output current of the DC-DC converter is used as an example, the invention is not limited thereto. Any value that has correlation with the applied voltage to the switching element S can be used.

For example, a voltage sensor that detects the voltage $V_{ds}$ between the drain terminal and source terminal of the switching element S may be provided around the switching element S, and a delay time $T_d$ may be secured based on the detected value of the voltage sensor. Since the delay time $T_d$ is secured based on the applied voltage to the switching element S itself, it can respond even if a load is unexpectedly applied to the switching element S for some reason. As a result, the load on the switching element S can be reduced, even for events that occur suddenly.

In addition, a voltage sensor that detects voltage at both ends of the shunt capacitor $C_s$ may be provided, and a delay time $T_d$ may be secured based on the detected value of the voltage sensor. Since the voltage sensor detects voltage between both terminals of the switching element S without being affected by the parasitic inductance possessed with the switching element S, the applied voltage to the switching element S can be suppressed without depending on the structure of the switching element S.

Furthermore, for example, in a load driven according to the output power of the DC-DC converter, the delay time $T_d$ may be secured using a parameter that varies according to the output power. In this case, the delay time Td can be secured by using a map that shows a relationship between the parameters of the load and the applied voltage of the switching element S.

In addition, for example, in the above embodiments, the configuration in which the delay time $T_d$ is secured by controlling the switching frequency $f_s$ and duty ratio is described as an example, but the delay time $T_d$ may be secured by controlling either one of the switching frequency $f_s$ or the duty ratio.

For example, upon starting frequency control, even when the frequency is increased to the parallel resonance frequency $fr_2$, the delay time $T_d$ capable of soft switching may be estimated and the delay time $T_d$ when starting the frequency control may be calculated based on the estimated result. Then, the duty ratio may be set based on the calculated result. This allows soft switching over a wide range of switching frequency fs because the delay time Td can be secured for a predetermined period of time even if the frequency is increased to the parallel resonance frequency fr2, and the applied voltage to the switching element S can be suppressed.

Furthermore, for example, when the output power is controlled by duty ratio control, the maximum and minimum duty ratios corresponding to the maximum and minimum controllable output power values may be calculated. Then, the duty ratio may be controlled within the range of the calculated results to secure the delay time $T_d$. The method for controlling the delay time Td is selected appropriately in accordance with a type or characteristics of the load 4 and the situation in which the power-conversion system 10 is used.

Additionally, for example, in the present description, the resonance-type power converter according to the present invention has been described using inverter 2 as an example, however, the present invention is not limited thereto. Further, in the present description, the switching element according to the present invention has been described using the switching element S as an example, however, the present invention is not limited thereto.

DESCRIPTION OF REFERENCE NUMERALS

10 . . . power-conversion system
1 . . . input-voltage source
2 . . . inverter
3 . . . rectifier
4 . . . load
5 . . . controller

The invention claimed is:
1. A method for controlling a resonance-type power converter, wherein the resonance-type power converter includes an inverter comprising a resonant circuit and a rectifier connected to the inverter and is configured to convert power of a DC power source and output a DC voltage of a predetermined target voltage,
wherein the method comprises:
when a switching frequency of a switching element included in the inverter satisfies a following formula (1),

$$f_{r1} < f_s \qquad (1)$$

by controlling at least either one of a switching frequency of the switching element, or a duty ratio indicating an ON period of the switching element, securing a delay time from voltage at both ends of the switching element reaching zero voltage by resonance of the resonant circuit in an OFF state of the switching element until the switching element is turned on, and turning on the switching element within the delay time, wherein when the switching frequency satisfies a following formula (2), $$f_{r1} < f_s < f_{r2} \qquad (2)$$

reducing output power of the resonance-type power converter by stabilizing the duty ratio and raising the switching frequency, and when the switching frequency satisfies a following formula (3), $$f_{r2} \leq f_s \qquad (3)$$

reducing the output power by stabilizing the switching frequency and reducing the duty ratio, wherein, $f_{r1}$ represents a resonance frequency of the resonant circuit in an ON state of the switching element, $f_{r2}$ represents a resonance frequency of the resonant circuit in the OFF state of the switching element, and $f_s$ represents a switching frequency of the switching element.

2. The method for controlling the resonance-type power converter according to claim 1, further comprising:

setting a duty ratio when controlling a switching frequency of the switching element such that the delay time is secured for a predetermined time even when the switching frequency is increased to a resonance frequency of the resonant circuit in the OFF state of the switching element.

3. The method for controlling the resonance-type power converter according to claim 1, further comprising:

acquiring an output current value of the resonance-type power converter; and securing the delay time based on the output current.

4. The method for controlling the resonance-type power converter according to claim 1, further comprising:

acquiring a voltage value of voltage at both ends of the switching element; and securing the delay time based on the voltage value of voltage at both ends of the switching element.

5. The method for controlling the resonance-type power converter according to claim 1, wherein the resonant circuit includes a capacitor parallelly connected to the switching element, and the method further comprising:

acquiring a voltage value of voltage at both ends of the capacitor; and securing the delay time based on the voltage value of the voltage at both ends of the capacitor.

6. The method for controlling the resonance-type power converter according to claim 1, wherein the delay time is a value within a range of a following formula (5), $$0 < T_d < \frac{1}{2f_s} \qquad (5)$$

wherein, $T_d$ represents the delay time.

7. The method for controlling the resonance-type power converter according to claim 1, wherein the resonant circuit includes a capacitor and an inductance serially connected to the switching element, and a capacitor parallelly connected to the switching element.

8. A resonance-type power converter, comprising:

a switching element included in an inverter and parallelly connected to a DC power source;

a resonant circuit connected to the switching element;

a rectifier connected to the inverter; and a controller for controlling the switching element, wherein the controller is configured to:

when a switching frequency satisfies a following formula (1), $$f_{r1} < f_s \qquad (1)$$

secure, by controlling at least either one of a switching frequency of the switching element, or a duty ratio indicating an ON period of the switching element, a delay time from voltage at both ends of the switching element reaching zero voltage by resonance of the resonant circuit in an OFF state of the switching element to the switching element being turned on;

turn on the switching element within the delay time;

when the switching frequency satisfies a following formula (2), $$f_{r1} < f_s < f_{r2} \qquad (2)$$

reduce output power of the resonance-type power converter by stabilizing the duty ratio and raising the switching frequency; and when the switching frequency satisfies a following formula (3), $$f_{r2} \leq f_s \qquad (3)$$

reduce the output power by stabilizing the switching frequency and reducing the duty ratio wherein, $f_{r1}$ represents a resonance frequency of the resonant circuit in an ON state of the switching element, $f_{r2}$ represents a resonance frequency of the resonant circuit in the OFF state of the switching element, and $f_s$ represents a switching frequency of the switching element.

* * * * *